Nov. 13, 1951     F. N. CRONHOLM     2,575,260
COFFEE BREWER
Filed Jan. 13, 1947
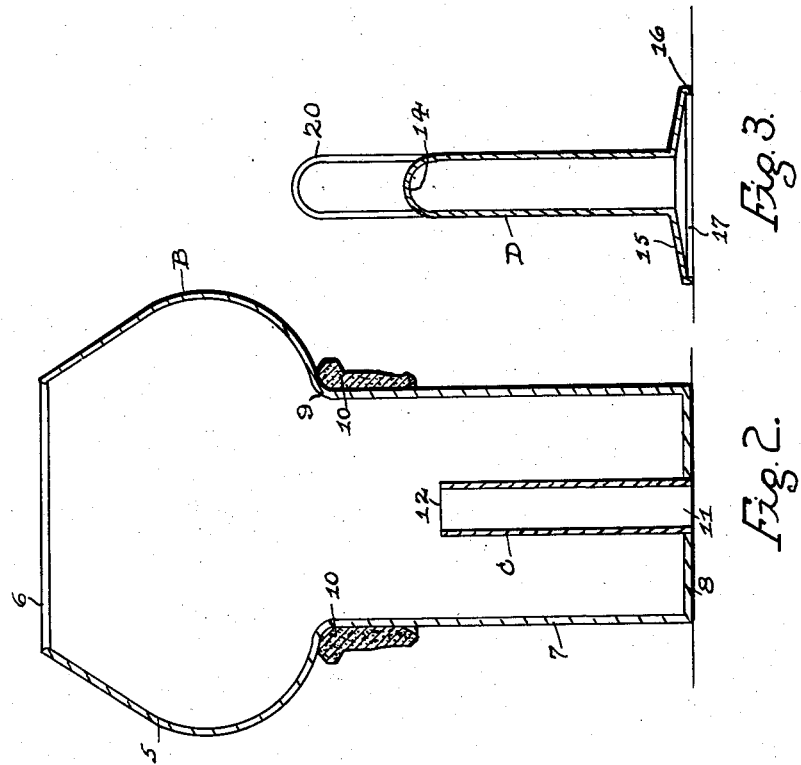
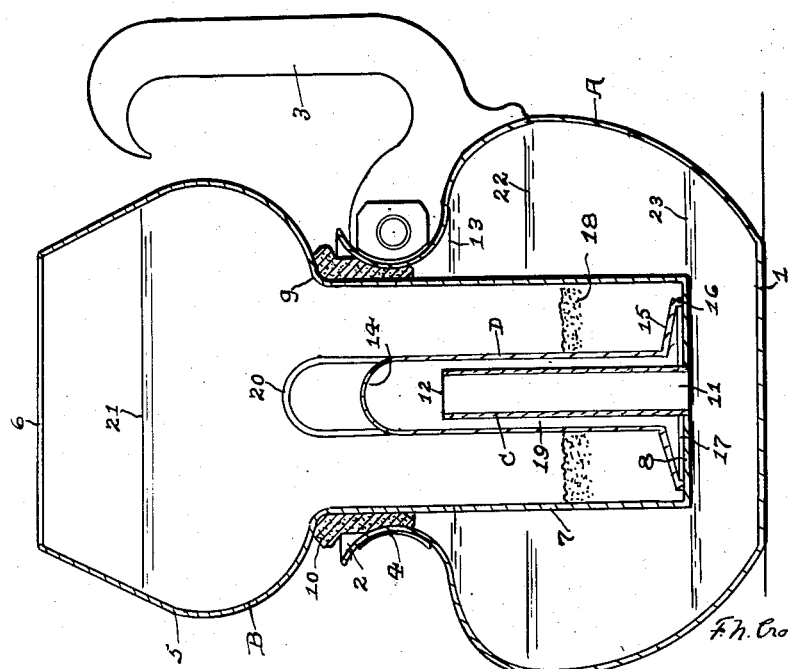
Inventor
F. N. Cronholm
Pattison, Wright & Pattison
Attorneys Patented Nov. 13, 1951

2,575,260

UNITED STATES PATENT OFFICE 2,575,260

COFFEE BREWER

Fredrik N. Cronholm, Salt Lake City, Utah

Application January 13, 1947, Serial No. 721,735

2 Claims. (Cl. 99—292)

This invention relates to a coffee brewer of the type generally referred to and identified as a vacuum type coffee brewer and is a continuation in part of my companion application Serial No. 497,659, entitled "Coffee Brewer," now abandoned.

In this type of brewer there is a lower vessel having an open upper end which is sealed by an upper vessel. Water is placed in the lower vessel and coffee in the upper vessel. The lower vessel is heated until sufficient pressure is created in the lower vessel to force the water into the upper vessel where it mixes with the coffee. The temperature in the lower vessel is then permitted to reduce and a vacuum is created in the lower vessel which draws the liquid, which is now brewed coffee, from the upper vessel back into the lower vessel. The interconnection between the two vessels is such that water can enter the upper vessel only when forced thereinto by pressure in the lower vessel and can return only to the lower vessel when drawn by vacuum from the upper vessel. A specific arrangement by which this method of brewing coffee is performed is described in detail hereinafter.

One of the objects of the present invention is that of providing a coffee brewer of the vacuum type in which the liquid is substantially entirely drained from the upper vessel with the result that the coffee grounds are substantially entirely dry which greatly increases the efficiency of the brewer as no brewed or liquid coffee remains in the upper vessel upon the completion of the brewing operation.

Another object of the invention is to so construct the brewer that the mass diameter or area of the coffee grounds are subjected to the suction of the vacuum so as to totally extract from the grounds all of the brew.

Another object of the invention is the provision of a vacuum type coffee brewer which when in operation has an extremely low center of gravity with the result that the brewer is not top heavy and unstable.

A still further object of the invention is the provision of a coffee brewer of the type referred to in which the bottom of the upper vessel is flat which permits it to be stood or set upon its bottom when it is removed from the lower vessel upon the completion of the brewing operation.

Another object of the invention is the provision of a vacuum type coffee brewer which is comparatively simple and cheap of manufacture but simple yet highly efficient in operation and so constructed as to reduce to the minimum the strain on the gasket which maintains the vacuum fit between the upper and lower vessels during the brewing operation.

Other objects, novel features of construction and advantages of the invention will be apparent to those familiar with this art and will appear in part from the following description when read in the light of the accompanying drawings in which a structural embodiment of a coffee brewer made in accordance with the inventive concept is illustrated.

In the drawings:

Fig. 1 is a vertical sectional view through line coffee brewer.

Fig. 2 is a detail view in vertical section of the upper or inner vessel.

Fig. 3 is a detail view in vertical section of the cap comprising a portion of the conduit interconnecting the upper and lower vessels.

Describing now the invention and the novel features and advantages thereof, A is the lower vessel or decanter and is comparatively large of diameter and provided with a flat bottom 1 upon which it rests when sitting upon a stove or other suitable heater. The vessel has an open upper end surrounded by an outwardly flared collar 2. The vessel is provided with a handle 3 which is secured to the vessel by a suitable clamp ring 4 which encircles the upper flared end 2 of the vessel.

The vessel A in addition to being the lower vessel is also the outer one. The inner or upper vessel, designated as an entirety by B, has an upper enlarged end 5 having an open top 6. This vessel has its lower end opening into a secondary vessel part 7 which is of reduced diameter and of considerable over-all length terminating in a bottom 8. The reduction of size of the part 7 forms a shoulder 9 intermediate the length of the upper vessel and a gasket 10, of some suitable material such as rubber, surrounds the upper end of the vessel part 7 immediately beneath this shoulder.

When the upper and lower vessels are assembled the gasket 10 makes an airtight fit with the flared upper end 2 of the lower vessel and the length of the upper vessel part 7 is such that its bottom 8 is disposed quite closely adjacent the bottom 1 of the lower vessel.

The upper vessel part 7 is provided with an open ended conduit C the lower end 11 of which is in open communication with the interior of the lower vessel A while its open upper end 12 terminates in a plane just slightly above the maximum water level 13 attained in the lower vessel. The upper end of this conduit will hereinafter be referred to as the "crest" of the return flow conduit of the brewer.

A cap D loosely surrounds the conduit C and is provided with a closed upper end 14 disposed in spaced relationship to the upper end or crest of the conduit C. At its lower end this cap is outwardly flared to form a disc-like element 15, the peripheral edge of which is provided with a plurality of short downwardly extending leg-like portions 16, preferably although not necessarily three in number, which engage the bottom 8 of the upper vessel and support the cap in the manner illustrated in Fig. 1 of the drawings. This arrangement provides a plurality of slit openings or passageways 17 which provide communication between the lower end of the cap and the interior of the upper vessel. The diameter of the disc-like element 15 is only slightly less than that of the upper vessel portion 7 with the result that the coffee grounds 18, which are positioned in the bottom of the upper element, for substantially their entire mass diameter are supported upon the disc 15.

The cap D is of a diameter to provide around the conduit C a space 19 having a cross sectional area substantially the same as that of the interior of the conduit. The total areas of the several slit passageways 17 equal or slightly exceed the area of the pipe space 19. The cap can be made of any suitable material. For convenience in handling when removing from or inserting into the upper container the cap is provided with a finger loop 20 or other suitable extending portion which can be conveniently reached and grasped.

The maximum water level obtained in the upper and inner vessel is designated at 21 and it is to be noted, as will hereinafter be explained when the operation of the brewer is described, is in a plane a considerable distance above the top or crest 12 of the liquid conveying conduit C. As a matter of fact even when the lower vessel is charged only with a very small quantity of water this water will, when forced into the upper vessel, reach a level above the crest of the conduit C.

Numerous advantages and benefits of the brewer will be readily understood after a reading of the description of operation of the invention.

*Operation*

When coffee is to be brewed coffee grounds 18 in the correct amount are placed in the lower end of the upper brewing vessel and completely cover the disc-like end 15 of the cap D to a considerable depth. Water in the correct amount is placed in the decanter or lower vessel and when the greatest possible amount of brew is to be made the level of the water will be as indicated at 22 in Fig. 1 of the drawings. Upon the insertion of the inner and upper vessel the water level in the lower vessel will rise to the point 13 and it is to be noted that the crest or top of the conduit C is just slightly above this maximum water level obtainable in the decanter.

The brewer being assembled and charged as above described is ready for the brewing operation. In this operation the decanter is placed upon a suitable heater and when the water reaches a boiling point steam is generated which being unable to escape past the gasket 10 forces water upwardly over the crest 12 of the conduit C into the cap D. From this point the water travels downwardly in the space between the conduit and the cap and escapes into the coffee grounds through the slit openings or passageways 17.

The passage of water into and through the coffee grounds will continue until the water level in the lower vessel or decanter has reached the level indicated at 23 which is in the same horizontal plane with the lower open end 11 of the conduit or tube C. This movement of water will have kept the coffee grounds in a turbulent condition which is conducive to the extraction therefrom, to the greatest possible extent, of the coffee essence.

When the brewing operation has continued over the proper or desired length of time the lower vessel is removed from the source of heat and within a very short period of time the steam pressure will have reduced sufficiently to have created a vacuum in the lower vessel. Thereupon the water will start on its return to the lower vessel over the path it followed in reaching the upper vessel. The coffee grounds will move to the bottom of the upper vessel and the liquid which is returning to the lower vessel will of course be brewed coffee.

The return movement of the liquid in the form of brewed coffee will continue until the upper vessel is completely drained of liquid and due to the fact that the disc 15 extends substantially entirely throughout the entire area of the diameter of the mass of coffee grounds the suction created by the vacuum will substantially entirely drain the grounds of liquid thus assuring an economical operation and a maximum amount of brew.

At the moment of completion of the brewing operation it is inevitable that a small quantity of liquid in the space between the conduit C and the cap D below the crest of the conduit C will return to the upper vessel. Due however to the construction of the brewer the conduit C is extremely short and the crest is comparatively low with the result that the total quantity of liquid which is not evacuated from the upper vessel is extremely small.

The conduit or conveying means for the passage of liquid from the lower to the upper vessel and for its return lie wholly within the upper vessel and also within the outer diameter of the reduced sized depending lower end portion 7 of the upper vessel. This construction makes it possible for the conduit to be short with the resultant mentioned advantages.

The lower vessel is of large diameter which reduces the overall height of the brewer thus reducing the necessary elevation of the liquid during the brewing operation which results, even with the liquid in the upper vessel, in a stable structure having a low center of gravity and having no tendency to be top heavy. Additionally by having to elevate the liquid only a comparatively short distance the strain upon the gasket 10 is comparatively small thus reducing the tendency of leakage and obviating the necessity of pressing the gasket into such tight engagement as to make it difficult to loosen when the upper vessel is removed from the lower vessel.

During the brewing operation a large quantity of the liquid transferred to the upper vessel is contained within the reduced sized depending lower end 7 thereof which is within the lower vessel. This distribution of weight keeps the center of gravity of the brewer extremely low thus giving to it the stability mentioned and consequently also making it unlikely to be accidentally upset.

In brewers of this type the upper vessel is removed upon the completion of the brewing operation and due to the liquid transferring conduit being entirely within the upper vessel this vessel can have a flat bottom upon which, when it is removed, it can be stood. At this time the coffee grounds will be compacted in the lower end of the upper vessel which will give to the vessel a low center of gravity so that when it is rested upon its bottom it will be stable and not likely to be upset.

At the start of the brewing operation, as illustrated in Fig. 1, the coffee grounds are dry because no water has entered the upper container notwithstanding the fact that the grounds and lower end 8 of the upper vessel are submerged deeply in the water and are far below the water level 22.

Vacuum coffee brewers are broadly not new but those in common use have liquid conduits extending far beneath the bottom of their upper vessels or containers. With those constructions frequent breakage of the extending conduits occur because such brewers are now commonly made of glass as are also the conduits. Breakage of the fragile extending conduit necessitates replacement of the entire upper container. These extending conduits make it difficult to handle the upper container when it is removed upon completion of brewing operation. The container cannot be rested upon its bottom and is therefore laid upon its side. Being round the container frequently rolls from the table, or other support upon which it rests, and breakage of the container results. These objectionable features are eliminated by the present improved brewer.

The liquid conduit being wholly within the upper container is advantageous. It simplifies the construction and makes a low "crest," with the advantages thereof, possible. Removal of the coffee grounds is simplified as this is accomplished by the removal of the cap D.

What I claim is:

1. A coffee brewer comprising, a lower container adapted to receive water to be heated and having an open upper end, an upper container supported upon the lower container and sealing the open upper end thereof, the upper container being in considerable part within the lower container and having a lower end disposed deep within the water in the lower container, the lower end of the upper container adapted to receive and support coffee grounds, a conduit constituting the sole communication between the upper and lower containers and comprising, an open ended pipe one end of which is in communication with the lower container through the bottom of the upper container and the other end of which terminates within the upper container in a horizontal plane just slightly above the maximum water level attained in the lower container, a tubular cap loosely surrounding said pipe and terminating in a lower open end flared outwardly to form a disc-like element, means supporting said disc slightly above the bottom of the upper container to provide communication between the interior of the cap and the interior of the container, said cap having an area only slightly less than that of the bottom of the container, coffee grounds surrounding and covering the outer face of said disc, said pipe and cap forming a continuous conduit the highest point of which is disposed in a horizontal plane just slightly above the maximum water level attained in the lower container, and said conduit being disposed wholly within the upper container and disposed in its entirety in a plane beneath that of the top of the lower container.

2. A construction as defined in claim 1 wherein, the cap is formed with a handle to facilitate its removal from the upper container.

FREDRIK N. CRONHOLM.

REFERENCES CITED

The following references are of record in the file of this patent:

UNITED STATES PATENTS

| Number | Name | Date |
| --- | --- | --- |
| 29,253 | Denley | July 24, 1860 |
| 106,572 | Funk et al. | Aug. 23, 1870 |
| 627,885 | Viser | June 27, 1899 |
| 629,878 | Stanford | Aug. 1, 1899 |
| 762,794 | Ziegler | June 14, 1904 |
| 1,920,121 | Baughman | July 25, 1933 |
| 2,151,407 | Lobl | Mar. 21, 1939 |
| 2,470,323 | Smith | May 17, 1949 |

FOREIGN PATENTS

| Number | Country | Date |
| --- | --- | --- |
| 1,715 | Great Britain | 1853 |
| 602,389 | France | Dec. 3, 1925 |
| 703,612 | Germany | Mar. 12, 1941 |